(12) United States Patent
Himmelmann et al.

(10) Patent No.: US 7,804,263 B2
(45) Date of Patent: Sep. 28, 2010

(54) CONTROL SYSTEM FOR A CONTROLLABLE PERMANENT MAGNET MACHINE

(75) Inventors: Richard A. Himmelmann, Beloit, WI (US); Mohammad Shahamat, Rockton, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 461 days.

(21) Appl. No.: 12/034,759

(22) Filed: Feb. 21, 2008

(65) Prior Publication Data

US 2009/0212730 A1 Aug. 27, 2009

(51) Int. Cl.
*H02P 7/00* (2006.01)

(52) U.S. Cl. ........................ 318/432; 318/140; 417/334; 290/34; 290/40 C

(58) Field of Classification Search ......... 318/140–150, 318/432; 322/34, 38, 40; 290/34, 40 C; 417/334; 310/81, 190
See application file for complete search history.

(56) References Cited

U.S. PATENT DOCUMENTS

| | | | | |
|---|---|---|---|---|
| 5,421,705 A * | 6/1995 | Benckert | | 417/218 |
| 5,724,814 A * | 3/1998 | Ven et al. | | 60/618 |
| 6,504,278 B1 * | 1/2003 | Bald et al. | | 310/81 |
| 7,053,498 B1 * | 5/2006 | Boisvert et al. | | 290/40 R |
| 7,250,688 B2 * | 7/2007 | Thomson et al. | | 290/34 |
| 7,385,332 B2 * | 6/2008 | Himmelmann et al. | | 310/190 |
| 7,459,800 B2 * | 12/2008 | Boisvert et al. | | 290/40 C |
| 2006/0012179 A1 * | 1/2006 | Thomson et al. | | 290/34 |
| 2006/0107681 A1 * | 5/2006 | Uno et al. | | 62/323.1 |
| 2006/0156916 A1 * | 7/2006 | Boisvert et al. | | 91/499 |
| 2006/0186669 A1 * | 8/2006 | Ruggieri et al. | | 290/2 |
| 2006/0210406 A1 * | 9/2006 | Harvey et al. | | 417/334 |
| 2006/0213218 A1 * | 9/2006 | Uno et al. | | 62/467 |
| 2006/0249956 A9 * | 11/2006 | Thomson et al. | | 290/34 |
| 2007/0241628 A1 * | 10/2007 | Himmelmann et al. | | 310/190 |
| 2008/0290842 A1 * | 11/2008 | Davis et al. | | 320/166 |
| 2009/0134848 A1 * | 5/2009 | Boisvert et al. | | 322/38 |
| 2010/0097038 A1 * | 4/2010 | Boisvert et al. | | 322/34 |
| 2010/0097040 A1 * | 4/2010 | Boisvert et al. | | 322/40 |

OTHER PUBLICATIONS

U.S. Appl. No. 11/405,743, Himmelmann, Richard A.

* cited by examiner

*Primary Examiner*—Paul Ip
(74) *Attorney, Agent, or Firm*—Stephen G. Mican

(57) ABSTRACT

A dynamoelectric machine that has at least one rotor component proximate a stator that is axially displaceable from the stator in response to pressure of lubrication oil delivered to its lubrication system has a system for changing axial displacement of each axially displaceable rotor component from the stator to cause a corresponding change in rotor-stator magnetic flux interaction, comprising: a hydraulic pump for generating a flow of lubrication oil; and means for regulating the flow of lubrication oil to the machine to develop a corresponding lubrication oil pressure that controls axial displacement of each axially displaceable rotor component.

20 Claims, 2 Drawing Sheets

CONTROL SYSTEM FOR A CONTROLLABLE PERMANENT MAGNET MACHINE

FIELD OF THE INVENTION

The invention relates to a control system for a dynamoelectric machine, and more particularly to a control system for adjusting rotor-stator magnetic flux interaction in a dynamoelectric machine of the permanent magnet type.

BACKGROUND OF THE INVENTION

U.S. Ser. No. 11/405,743 to Himmelmann, filed 17 Apr. 2006, now U.S. Pat. No. 7,385,332, with which this application has common inventorship and ownership, describes various dynamoelectric machines of the permanent magnet type. Such machines may have rotor magnets that are axially displaceable from a corresponding stator assembly to vary rotor-stator magnetic flux interaction, such as to reduce back electromagnetic force (emf) generation in motor operation at high rotational velocities and thereby improve high-velocity motor torque. Rotor displacement may conveniently be by means of hydraulic actuation driven by machine lubrication oil pressure. In such an instance, it may be necessary to have some means of adjusting such lubrication oil pressure to control rotor magnet displacement.

SUMMARY OF THE INVENTION

For a dynamoelectric machine that has at least one rotor component proximate a stator that is axially displaceable from the stator in response to pressure of lubrication oil delivered to its lubrication system, the invention generally comprises a system for changing axial displacement of each axially displaceable rotor component from the stator to cause a corresponding change in rotor-stator magnetic flux interaction, comprising: a hydraulic pump for generating a flow of lubrication oil; and means for regulating the flow of lubrication oil to the machine to develop a corresponding lubrication oil pressure that controls axial displacement of each axially displaceable rotor component.

DETAILED DESCRIPTION OF THE INVENTION

Figure 1:
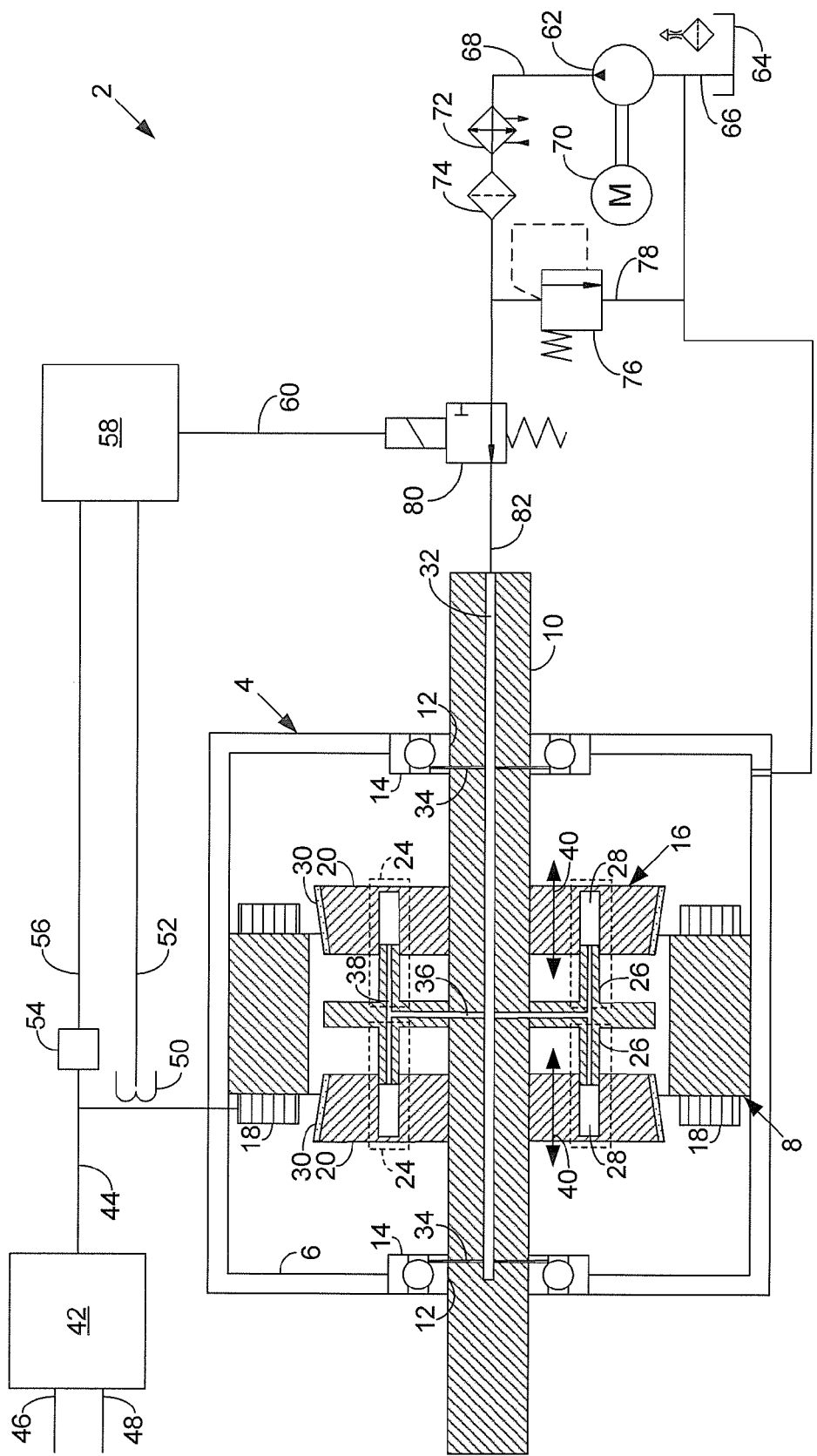
FIG. 1 is a schematic diagram of a machine rotor displacement control system according to a possible embodiment of the invention.

FIG. 1 is a schematic diagram of a machine rotor displacement control system 2 according to a possible embodiment of the invention for dynamoelectric machines as described in Himmelmann, which this application incorporates by reference. A dynamoelectric machine 4 has a housing 6, a stator assembly 8 coupled to the housing 6, a drive shaft 10 with journal sections 12 supported by bearings 14 and a rotor assembly 16 coupled to the drive shaft 10 proximate the stator assembly 8. The stator assembly 8 comprises multiple stator poles 18.

The rotor assembly 16 comprises a rotor yoke 20 coupled to at least one rotor hub 22 by way of at least one hydraulic actuator assembly 24. By way of example only, FIG. 1 shows two rotor hubs 22 so coupled to the rotor yoke 20. Each hydraulic actuator assembly 24 comprises a rotor yoke projection 26 and a rotor hub aperture 28. Each rotor hub 22 also mounts multiple permanent magnets 30 proximate the stator poles 18.

The drive shaft 10 comprises at least one axial lubrication oil channel 32 that serves as a conduit for lubrication oil within the axial lubrication oil channel 32 to lubricate the bearings 14 by way of multiple radial lubrication oil channels 34. The axial lubrication oil channel 32 also couples to each hydraulic actuator assembly 24 by way of at least one radial yoke channel 36 and at least one axial yoke channel 38. Variance in pressure of lubrication oil within the axial lubrication oil channel 32 will therefore cause the rotor hubs 22 to change their axial displacement from the rotor yoke 20 as represented by arrows 40.

Typically, an electronic dynamoelectric machine controller 42 supplies multiphase alternating current power to the stator assembly 8 of the machine by way of a multiphase power bus 44. The machine controller 42 develops a level of current to establish a desired rotational velocity and torque for the machine 4, typically in response to rotational velocity and torque input signals that the machine controller 42 may receive on a rotational velocity signal line 46 and a torque signal line 48, respectively. In order to control the axial displacement of the rotor hubs 22 to establish a level of rotor-stator magnetic flux interaction appropriate to maintain desired torque at any desired rotational velocity of the machine 4, a multiphase current sensor system 50 senses the level of current on the power bus 44 and generates a corresponding power bus current level signal on a current signal line 52 whilst a multiphase electric potential current sensor system 54 senses the level of potential on the power bus 44 and generates a corresponding power bus potential level signal on a potential signal line 56. An electronic rotor position controller 58 receives the power bus current potential signal on the current signal line 52 and the power bus potential signal on the potential signal line 56 and generates a rotor position control signal on a position controller signal line 60. Alternatively, the electronic rotor position controller 58 may be responsive to one or more other input signals, such as a machine rotational velocity signal generated by a rotational velocity sensor (not shown) coupled to the drive shaft 10 of the machine 4.

A hydraulic pump 62 sucks lubrication oil from a reservoir 64 by way of a pump supply line 66 and discharges it into a pump discharge line 68. A dedicated pump motor 70 may drive the hydraulic pump 62 as shown in FIG. 1 or the machine 4 may drive it instead. An optional heat exchanger 72 may cool the lubrication oil that the pump 62 discharges into the pump discharge line 68. An optional oil filter 74 may filter the lubrication oil that the pump 62 discharges into the pump discharge line 68.

A pressure control valve 76 limits pressure of the lubrication oil in the pump discharge line 68 to a desired maximum level of pressure by release of lubrication oil back to the pump supply line 66 by way of a pressure control valve drain line 78. A solenoid-operated, normally open flow control valve 80 couples lubrication oil from the pump discharge line 68 to the axial lubrication oil channel 32 in the drive shaft 10 of the machine 4 by way of a lubrication oil supply line 82. The flow control valve 80 receives the position control signal on the position controller signal line 60 to regulate flow of lubrication oil to the axial lubrication oil channel 32, and therefore pressure of lubrication oil in each hydraulic actuator assembly 24 to which it couples. The pressure of the lubrication oil in each hydraulic actuator assembly 24 thereby controls the axial displacement of its corresponding rotor hub 22. Since each rotor hub 22 mounts multiple permanent magnets 30 proximate the stator poles 18, axial displacement of the rotor hubs 22 changes magnetic flux interaction between the permanent magnets 30 and the stator poles 18, thereby changing the value of back EMF that the machine 4 may generate for any given rotational velocity.

The position control signal that the electronic rotor position controller 58 generates on the position controller signal line 60 controls the flow control valve 80 to maintain the axial displacement of the rotor hubs 22 to achieve a value of back EMF that allows maximum torque from the machine 4 at higher rotational velocities. In other words, at standstill and low rotational velocities, the position control signal will cause the flow control valve 80 to allow a relatively low flow of lubrication oil to the machine 4, thereby resulting in low lubrication oil pressure in the hydraulic actuators 54 and little or no displacement of the rotor hubs 22. In this instance, the rotor-stator flux will remain at or near maximum, with the result that the machine 4 may develop high torque at standstill and low rotational velocities.

As the rotational velocity of the machine 4 increases, so does its back EMF. In response to input signals such as the power bus current signal on the current signal line 52 and the power bus potential signal on the potential signal line 56, the electronic rotor position controller 58 changes the position control signal on the position controller signal line 60 to cause the flow control valve 80 to develop more lubrication oil flow, thereby resulting in higher lubrication oil pressure in the hydraulic actuators 54 that cause significant displacement of the rotor hubs 22. In this instance, the rotor-stator flux will decrease, with the result that the machine 4 will develop less back EMF at high rotational velocities that permits higher power bus current for any level of power bus potential and therefore higher developed torque.

The machine rotor displacement control system 2 is an active control system in that its means for regulating lubrication oil flow to the machine 4, and thereby pressure to the hydraulic actuators 24, is controllable by the electronic dynamoelectric machine controller 42 and the electronic rotor position controller 58 independent of the rotational velocity of the machine 4.

Figure 2:
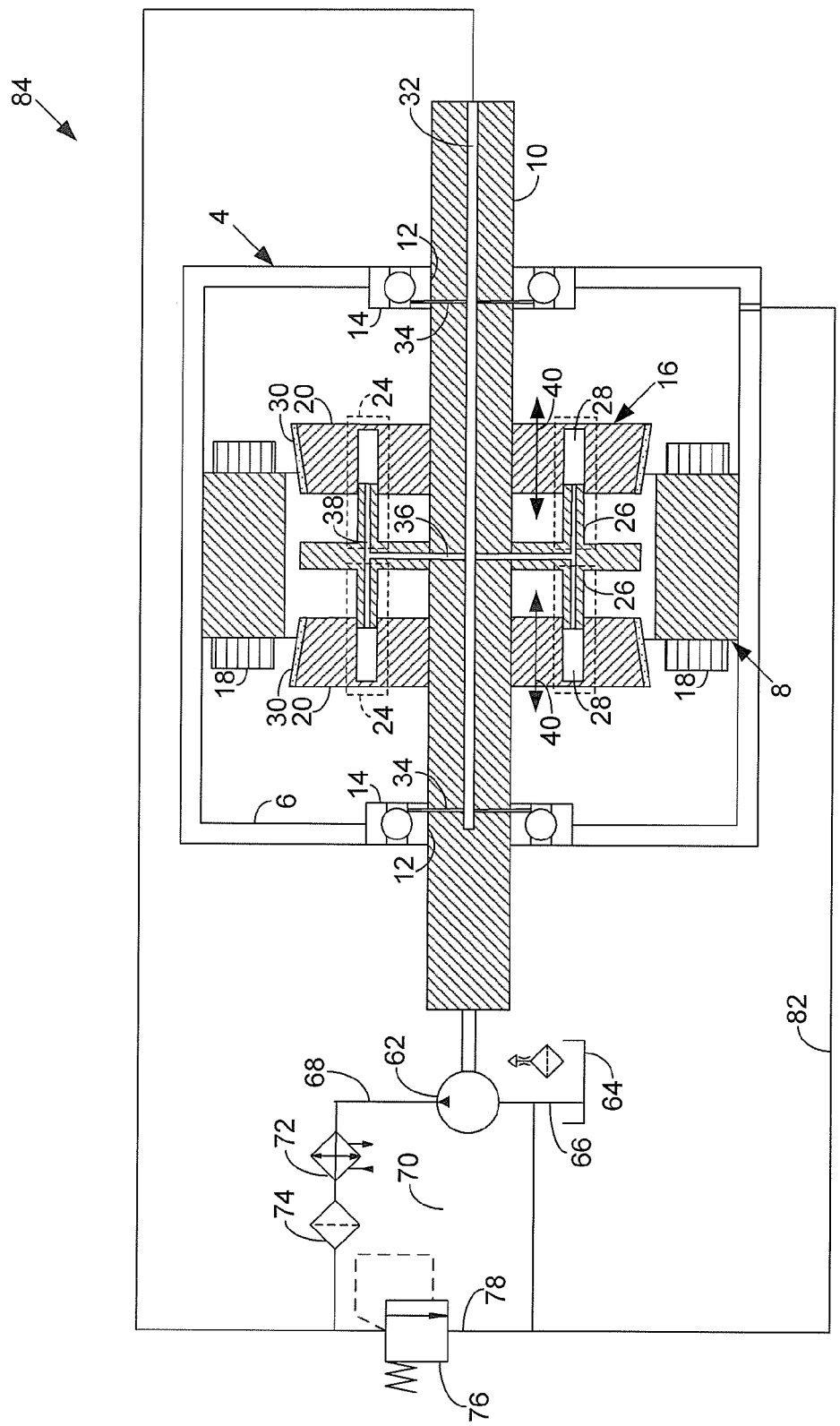
FIG. 2 is a schematic diagram of a machine rotor displacement control system according to another possible embodiment of the invention.

FIG. 2 is a schematic diagram of a machine rotor displacement control system 84 according to another possible embodiment of the invention. The machine rotor displacement control system 84 has the machine 4 drive the hydraulic pump 62 directly. The pump discharge line 68 couples directly to the lubrication oil supply line coupled to the axial lubrication oil channel in the drive shaft 10. The sizing of the hydraulic pump 62 matches the rotational velocity of the machine 4 such that it supplies the proper value of lubrication oil flow to the machine 4 to develop the desired lubrication oil pressure in the hydraulic actuators 24 of the machine 4 to axially displace the rotor hubs 20 to a position that develops the correct magnetic flux interaction between the rotor magnets 30 and the stator poles 18 to achieve reduced back EMF at higher rotational velocities of the machine 4, and therefore higher developed torque as well.

The machine rotor displacement control system 84 is a passive control system in that its means for regulating lubrication oil flow to the machine 4, and thereby pressure to the hydraulic actuators 24, is a function of the displacement of the hydraulic pump 62 in combination with its rotational velocity and therefore the rotational velocity of the machine 4.

The described embodiments of the invention are only some illustrative implementations of the invention wherein changes and substitutions of the various parts and arrangement thereof are within the scope of the invention as set forth in the attached claims.

The claimed invention is:

1. For a dynamoelectric machine that has at least one rotor component proximate a stator that is axially displaceable from the stator in response to pressure of lubrication oil delivered to its lubrication system, a system for changing axial displacement of each axially displaceable rotor component from the stator to cause a corresponding change in rotor-stator magnetic flux interaction, comprising:
   a hydraulic pump for generating a flow of lubrication oil; and
   means for regulating the flow of lubrication oil to the machine to develop a corresponding lubrication oil pressure that controls axial displacement of each axially displaceable rotor component.

2. The system of claim 1, wherein the means for regulating flow of lubrication oil to the machine comprises a coupling between the machine and the hydraulic pump.

3. The system of claim 2, further comprising a pressure control valve for limiting the developed lubrication oil pressure to a desired maximum level of pressure.

4. The system of claim 1, wherein the means for regulating flow of lubrication oil to the machine comprises:
   an electronic rotor position controller that generates a rotor position control signal; and
   a solenoid-operated flow control valve that regulates the flow of lubrication oil to the machine in response to the rotor position control signal.

5. The system of claim 4, further comprising:
   a power bus current sensor system for measuring current supplied to the dynamoelectric machine on a power bus and generating a power bus current signal representative of the measured current; and
   a power bus electrical potential current sensor system for measuring electrical potential on the power bus and generating a power bus potential signal representative of the measured potential;
   wherein the electronic rotor position controller generates its rotor position control signal in response to the power bus current signal and the power bus potential signal.

6. The system of claim 5, further comprising an electronic dynamoelectric machine controller for controlling electrical power on the power bus.

7. The system of claim 6, wherein the machine controller is responsive to a rotational velocity signal and a torque signal.

8. The system of claim 4, further comprising a pressure control valve for limiting the developed lubrication oil pressure to a desired maximum level of pressure.

9. The system of claim 4, further comprising a motor coupled to the hydraulic pump for powering the pump.

10. The system of claim 4, wherein the machine powers the hydraulic pump.

11. For a dynamoelectric machine that has at least one rotor component proximate a stator that is axially displaceable from the stator in response to pressure of lubrication oil delivered to its lubrication system, a method for changing axial displacement of each axially displaceable rotor component from the stator to cause a corresponding change in rotor-stator magnetic flux interaction, comprising the steps of:
   generating a flow of lubrication oil; and
   regulating the flow of lubrication oil to the machine to develop a corresponding lubrication oil pressure that controls axial displacement of each axially displaceable rotor component.

12. The method of claim 11, wherein the step of regulating the flow of lubrication oil to the pump comprises coupling the machine to the hydraulic pump.

13. The method of claim 12, further comprising the step of limiting the developed lubrication oil pressure to a desired maximum level of pressure.

14. The method of claim 11, wherein the step of regulating the flow of lubrication oil to the pump comprises:

generating a rotor position control signal; and regulating the flow of lubrication oil to the machine in response to the rotor position control signal.

15. The method of claim 14, further comprising the steps of:

measuring current supplied to the dynamoelectric machine on a power bus;

generating a power bus current signal representative of the measured current;

measuring electrical potential on the power bus; and generating a power bus potential signal representative of the measured potential;

wherein the rotor position control signal responds to the power bus current signal and the power bus potential signal.

16. The method of claim 15, further comprising the step of controlling electrical power on the power bus.

17. The method of claim 16, wherein the controlled electrical power is responsive to a rotational velocity signal and a torque signal.

18. The method of claim 14, further comprising the step of limiting the developed lubrication oil pressure to a desired maximum level of pressure.

19. The method of claim 14, wherein a source of power other than the machine controls the generation of lubrication oil flow.

20. The method of claim 14, wherein the machine controls the generation of lubrication oil flow.

* * * * *